United States Patent
Ahuja et al.

(10) Patent No.: US 10,997,470 B2
(45) Date of Patent: May 4, 2021

(54) ADVERSARIAL PATCHES INCLUDING PIXEL BLOCKS FOR MACHINE LEARNING

(71) Applicant: Accenture Global Solutions Limited, Dublin (IE)

(72) Inventors: Manish Ahuja, Bengaluru (IN); Samarth Sikand, Jaipur (IN); Anurag Dwarakanath, Bangalore (IN); Sanjay Podder, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 109 days.

(21) Appl. No.: 16/557,385

(22) Filed: Aug. 30, 2019

(65) Prior Publication Data

US 2021/0064938 A1     Mar. 4, 2021

(51) Int. Cl.
*G06K 9/62*      (2006.01)
*G06K 9/46*      (2006.01)
*G06N 20/00*    (2019.01)

(52) U.S. Cl.
CPC ......... *G06K 9/6265* (2013.01); *G06K 9/4642* (2013.01); *G06K 9/4652* (2013.01); *G06N 20/00* (2019.01)

(58) Field of Classification Search
CPC .......... G06T 9/002; G06T 2207/20224; G06K 9/4652; G06K 9/6256
See application file for complete search history.

(56) References Cited

U.S. PATENT DOCUMENTS

| | | | | |
|---|---|---|---|---|
| 6,781,632 B1 * | 8/2004 | Ide | ......................... | G03B 13/00 348/345 |
| 6,819,360 B1 * | 11/2004 | Ide | .................... | H01L 27/14643 348/340 |
| 7,686,086 B2 * | 3/2010 | Brammer | ................ | E21B 43/36 166/357 |
| 7,812,881 B2 * | 10/2010 | Kusaka | .............. | H04N 5/36961 348/350 |
| 7,903,896 B2 * | 3/2011 | Yamada | ................. | H04N 9/735 382/254 |
| 8,254,672 B2 * | 8/2012 | Matsuoka | .............. | H04N 1/642 382/166 |
| 9,691,114 B2 * | 6/2017 | Ashrafzadeh | ........ | G06Q 10/087 |

OTHER PUBLICATIONS

Christian Szegedy et al., "Intriguing properties of neural networks", Dec. 21, 2013, 9 pages.
Ian Goodfellow et al., "Explaining and Harnessing Adversarial Examples", International Conference on Learning Representations, Mar. 20, 2015, 11 pages.

(Continued)

*Primary Examiner* — Yosef Kassa
(74) *Attorney, Agent, or Firm* — Jordan IP Law, LLC

(57) ABSTRACT

Systems, apparatuses, and methods are directed towards identifying that an adversarial patch image includes a plurality of pixels. The systems, apparatuses, and methods include dividing the adversarial patch image into a plurality of blocks, that each include a different group of the pixels in which the pixels are contiguous to each other, and assigning a first plurality of colors to the plurality of blocks to assign only one of the first plurality of colors to each pixel of one of the plurality of blocks.

20 Claims, 8 Drawing Sheets

(56) References Cited

OTHER PUBLICATIONS

Alexey Kurakin et al., "Adversarial examples in the physical world", Jul. 8, 2016, 15 pages.
Christian Szegedy et al., "Rethinking the Inception Architecture for Computer Vision", 2016, 9 pages, Computer Vision Foundation.
Tom B. Brown et al., "Adversarial Patch", 31st Conference on Neural Information Processing Systems, Dec. 27, 2017, 6 pages, Long Beach, CA, USA.
Jiajun Lu et al., "No Need to Worry about Adversarial Examples in Object Detection in Autonomous Vehicles", Jul. 12, 2017, 9 pages.
Jiawei Su et al., "One pixel attack for fooling deep neural networks", Oct. 24, 2017, 9 pages.
Anish Athalye et al., "Synthesizing Robust Adversarial Examples", Jun. 7, 2018, 19 pages.
Kevin Eykholt et al., "Robust Physical-World Attacks on Deep Learning Visual Classification", Apr. 10, 2018, 11 pages.
Anish Athalye, "Robust Adversarial Examples", 5 pages.
Tensorflow, "TensorFlow Android Camera Demo", 4 pages.

\* cited by examiner

ADVERSARIAL PATCHES INCLUDING PIXEL BLOCKS FOR MACHINE LEARNING

FIELD OF THE DISCLOSURE

This disclosure generally relates to methods, systems, apparatuses, and computer readable media for generation of adversarial patches to train deep learning models, neural network models and/or for machine learning applications.

BACKGROUND

Machine learning systems (e.g., neural networks or deep learning systems) may suffer from small guided adversarial perturbations. The adversarial perturbations may be intentionally inserted to robustly train the machine learning systems. That is, a more robust machine learning system may be generated by testing the machine learning system against adversarial patches. The machine learning system may misclassify an image (that includes the adversarial patch) and then the machine learning system retrains to eliminate or minimize such misclassifications.

SUMMARY

Consistent with the disclosure, exemplary embodiments of systems, apparatuses, and methods thereof for generating enhanced adversarial patches, are disclosed.

According to an embodiment, an adversarial patch generation system, includes a memory, and a processor coupled to the memory, wherein the processor is configured to identify that an adversarial patch image includes a plurality of pixels, divide the adversarial patch image into a plurality of blocks that each include a different group of the pixels in which the pixels are contiguous to each other, and assign a first plurality of colors to the plurality of blocks to assign only one of the first plurality of colors to each pixel of one of the plurality of blocks.

In an embodiment of the system, the processor is to assign a first color of the first plurality of colors to a first block of the plurality of blocks, and modify each pixel of the group of the pixels of the first block to be the first color.

In an embodiment of the system, the processor is to execute an iterative process to during a first iteration, assign a second color to the first block, during a second iteration, change the second color to a third color and assign the third color to the first block, and during a final iteration, change the third color to the first color to assign the first color to the first block.

In an embodiment of the system, the processor is to for each respective block of the plurality of blocks, modify the group of the pixels of the respective block to be a same color of the first plurality of colors that is assigned to the respective block.

In an embodiment of the system, the processor is to execute an iterative process to generate first pixel values for the plurality of pixels during a final iteration, wherein the first pixel values are to be associated with the first plurality of colors.

In an embodiment of the system, the processor is to execute the iterative process to generate during a previous iteration before the final iteration, second pixel values for the plurality of pixels, wherein the second pixel values correspond to a second plurality of colors, and generate the first pixel values based on the second pixel values.

In an embodiment of the system, the processor is to identify, during the final iteration, a first loss that is a measure that the adversarial patch image having the first pixel values causes a machine learning system to misclassify an object, identify, during the previous iteration, a second loss that is a measure that the adversarial patch image having the second pixel values causes a machine learning system to misclassify the object, and determine that the adversarial patch image is to have the first pixel values and not the second pixel values based on an identification that first loss meets a threshold and the second loss does not meet the threshold.

In an embodiment, a method includes identifying that an adversarial patch image includes a plurality of pixels, dividing the adversarial patch image into a plurality of blocks that each include a different group of the pixels in which the pixels are contiguous to each other, and assigning a first plurality of colors to the plurality of blocks to assign only one of the first plurality of colors to each pixel of one of the plurality of blocks.

In an embodiment of the method, further includes assigning a first color of the first plurality of colors to a first block of the plurality of blocks, and modifying each pixel of the group of the pixels of the first block to be the first color.

In an embodiment of the method, further includes executing an iterative process that includes during a first iteration, assigning a second color to the first block, during a second iteration, changing the second color to a third color and assigning the third color to the first block, and during a final iteration, changing the third color to the first color to assign the first color to the first block.

An embodiment of the method further includes for each respective block of the plurality of blocks, modifying the group of the pixels of the respective block to be a same color of the first plurality of colors that is assigned to the respective block.

An embodiment of the method further comprises executing an iterative process to generate first pixel values for the plurality of pixels during a final iteration, wherein the first pixel values are to be associated with the first plurality of colors.

In an embodiment of the method, the executing the iterative process includes generating during a previous iteration before the final iteration, second pixel values for the plurality of pixels, wherein the second pixel values correspond to a second plurality of colors, and generating the first pixel values based on the second pixel values.

In an embodiment, a non-transitory computer readable medium includes a set of instructions, which when executed by one or more processors of a device, cause the one or more processors to identify that an adversarial patch image includes a plurality of pixels, divide the adversarial patch image into a plurality of blocks that each include a different group of the pixels in which the pixels are contiguous to each other, and assign a first plurality of colors to the plurality of blocks to assign only one of the first plurality of colors to each pixel of one of the plurality of blocks.

In an embodiment of the non-transitory computer readable medium, the set of instructions, which when executed by the one or more processors, cause the one or more processors to assign a first color of the first plurality of colors to a first block of the plurality of blocks, and modify each pixel of the group of the pixels of the first block to be the first color.

In an embodiment of the non-transitory computer readable medium, the set of instructions, which when executed by the one or more processors, cause the one or more processors to execute an iterative process to, during a first iteration, assign a second color to the first block, during a second iteration, change the second color to a third color and assign the third color to the first block, and during a final iteration, change the third color to the first color to assign the first color to the first block.

In an embodiment of the non-transitory computer readable medium, the set of instructions, which when executed by the one or more processors, cause the one or more processors to for each respective block of the plurality of blocks, modify the group of the pixels of the respective block to be a same color of the first plurality of colors that is assigned to the respective block.

In an embodiment of the non-transitory computer readable medium, the set of instructions, which when executed by the one or more processors, cause the one or more processors to execute an iterative process to generate first pixel values for the plurality of pixels during a final iteration, wherein the first pixel values are to be associated with the first plurality of colors.

In an embodiment of the non-transitory computer readable medium, the set of instructions, which when executed by the one or more processors, cause the one or more processors to execute the iterative process to generate during a previous iteration before the final iteration, second pixel values for the plurality of pixels, wherein the second pixel values correspond to a second plurality of colors, and generate the first pixel values based on the second pixel values.

In an embodiment of the non-transitory computer readable medium, the set of instructions, which when executed by the one or more processors, cause the one or more processors to identify, during the final iteration, a first loss that is a measure that the adversarial patch image having the first pixel values causes a machine learning system to misclassify an object, identify, during the previous iteration, a second loss that is a measure that the adversarial patch image having the second pixel values causes a machine learning system to misclassify the object, and determine that the adversarial patch image is to have the first pixel values and not the second pixel values based on an identification that the first loss meets a threshold and the second loss does not meet the threshold.

It is to be understood that both the foregoing general description and the following detailed description are exemplary and explanatory only and are not restrictive of the invention, as claimed.

BRIEF DESCRIPTION OF THE DRAWINGS

The various embodiments will become apparent to one skilled in the art by reading the following specification and appended claims, and by referencing the following drawings, in which:

DESCRIPTION OF THE EMBODIMENTS

Figure 1A:
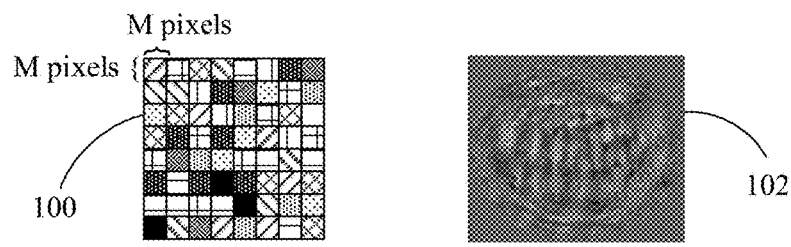
FIG. 1A shows an enhanced adversarial patch relative to a conventional patch according to some exemplary embodiments.

While the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," an illustrative embodiment," etc., indicate that the embodiment described may include a particular feature, structure, or characteristic, but every embodiment may or may not necessarily include that particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a machine readable (e.g., computer-readable) medium or machine-readable storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

A training process of a machine learning architecture may include capturing images of a target and feeding the captured images to the machine learning architecture. The machine learning architecture may then identify a probability that the captured images include a particular object (e.g., a stop sign, human being, stop light, right turn sign, etc.). The machine learning architecture may then be trained (e.g., supervised, unsupervised or semi-supervised learning) to increase correct identification of objects in the captured images.

Some machine learning architectures may appear to accurately detect objects during test settings. In real-world environments, the same machine learning architectures may be easily "fooled" into misclassifying an object. For example, some machine learning architectures may misclassify objects based on unforeseen environmental conditions (e.g., foggy, rainy, bright or low-light conditions). In some cases, nefarious actors may intentionally place physical patches over objects to cause machine learning architectures to misclassify the objects. For example, an actor may place a patch over a stop sign to cause a machine learning architecture to misclassify the stop sign as a speed limit sign.

Therefore, it may be beneficial to test the robustness of machine learning architectures prior to public use and release of the machine learning architectures. For example, a machine learning model may be tested against an adversarial patch. If the adversarial patch causes the machine learning model to misclassify an object, the machine learning model may need to be retrained with the adversarial patch. Thus, some embodiments may include an enhanced adversarial patch generation system to generate adversarial patches to be used to train and test the robustness of machine learning architectures. For example, some embodiments may generate adversarial patches that, during testing or training, cause machine learning architectures to misclassify an image to a desired target class despite variations in positions of the adversarial patches, camera angles and camera distances.

Some embodiments of the adversarial patch generation system may further modify characteristics (e.g., intensity, color, etc.) of blocks of contiguous pixels collectively rather than each individual pixel. Doing so may be more efficient than an individual analysis and modification of each pixel. Furthermore, the resulting adversarial patch that is generated through modification of blocks of pixels may be more likely to cause misclassification when captured through an imaging device than an adversarial patch that is generated through a pixel-by-pixel modification. For example, the resulting adversarial patch may include an easily discernible pattern by an average camera and that is able to be cause misclassifications from different angles, rotations and distances.

The enhanced adversarial patch generation system may result in several technical advantages, including raised testing standards to enhance efficiency, robustness and safety. For example, the adversarial patches described herein may be used to test the machine learning architectures to increase reliability of the machine learning architectures and determine the effectiveness of the machine learning architectures. Therefore, it is less likely that poor performing machine learning architectures will be publicly released. Doing so may lower the probability that the machine learning architectures will misclassify targets when used in operation, enhancing safety and robustness. Moreover, modifying contiguous blocks of pixels rather than each individual pixel results in a more efficient process.

Turning now to FIG. 1A, an enhanced adversarial patch 100 is illustrated. The enhanced adversarial patch 100 may include a series of blocks that are each M pixels by M pixels. The pixels of each block may be contiguous with each other. In the example of FIG. 1A, the blocks are illustrated as having different patterns. Each different pattern may correspond to a different color. Identical patterns may be a same color. Within each block, each of the pixels of the block may be a same color. For example, characteristics of the pixels of a block may be identical aside from position. Thus, each block may be entirely one color so that a first block is a first color, a second block is a second color, a third block is a third color, etc. Therefore, the enhanced adversarial patch 100 may be consistently colored for blocks of pixels to avoid and/or reduce concern of physical world transformation effects on the patch. As a result, each respective pixel in the enhanced adversarial patch 100 will be a same color as at least one other pixel that is contiguous to the respective pixel. As described below, an adversarial patch generation system may apply an iterative process that includes forward-propagation and backward-propagation to generate the enhanced adversarial patch 100.

FIG. 1A shows a conventional patch 102 as well. The conventional patch 102 may be generated through a pixel-by-pixel analysis. That is, there is no requirement that contiguous blocks of pixels are the same color. Rather, each pixel may be sequentially analyzed to determine a color for the pixel, which may be different than all pixels contiguous to the pixel. Such a process is time-consuming, requires increased power relative to generation of the block-colored enhanced adversarial patch 100 and is less effective at causing machine learning models to misclassify. For example, the conventional patch 102 may not cause a machine learning model to misclassify at different zoom levels of an image capture device, different image capture angles of an image capture device relative to the conventional patch 102 and at different positions of the conventional patch 102 relative to an object. Moreover, different environmental conditions (e.g., bright light, low light, reflections, etc.) may further deteriorate the effectiveness of the conventional patch 102 to cause misclassification. In contrast, the enhanced adversarial patch 100 may accurately cause misclassifications regardless of characteristics of the image capture device and environmental conditions.

Figure 1B:
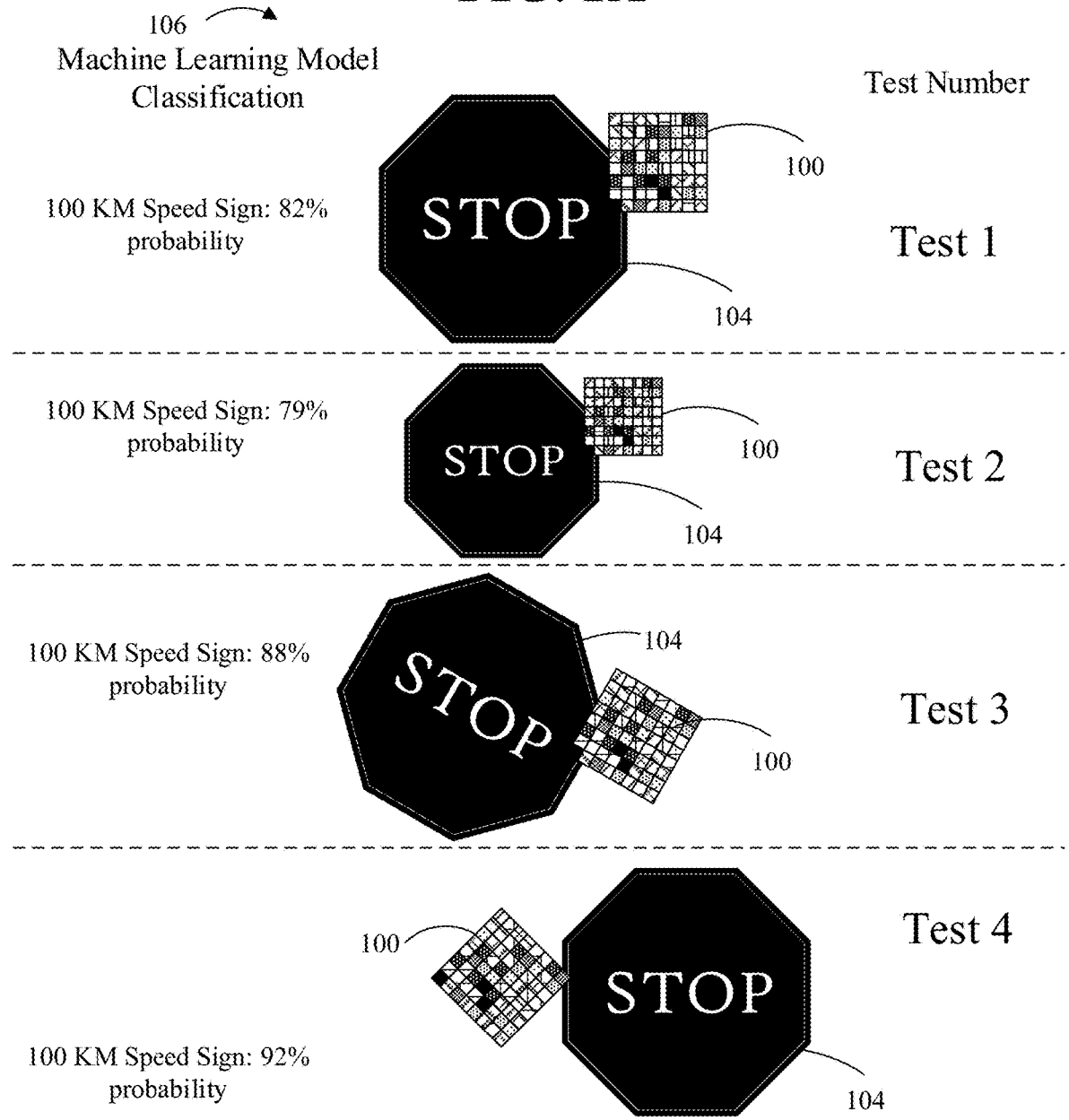
FIG. 1B shows a real-world scenario of machine learning model classifications, training and retraining according to some exemplary embodiments.

FIG. 1B illustrates a real-world scenario 106 of machine learning model (e.g., neural network) classifications of an image and the enhanced adversarial patch 100. In the example of FIG. 1B, the image is a stop sign 104. A series of Tests 1-4 are illustrated. In each of Tests 1-4, an imaging device 112 (discussed below) captures an image of the enhanced adversarial patch 100 and the stop sign 104. The machine learning model analyzes the images to identify and/or classify objects in the images. The machine learning model classifications are presented in FIG. 1. In some embodiments, the machine learning model may be trained and/or retrained using the adversarial patch 100.

As illustrated, in Test 1, the enhanced adversarial patch 100 causes the machine learning model to misclassify the stop sign 104. In detail, the machine learning model misclassifies the stop sign 104 as likely (82%) being a 100 KM speed sign.

In Test 2 the enhanced adversarial patch 100 causes the machine learning model to misclassify the stop sign 104 as likely (79%) being a 100 KM speed sign. As illustrated, the enhanced adversarial patch 100 is at a same position relative to the stop sign 104 in Test 1 and Test 2. In Test 2 however, the imaging device 112 has zoomed out and/or is positioned farther away from the stop sign 104 and the adversarial patch 100. Thus, in the image of Test 2, the stop sign 104 and the adversarial patch 100 appear smaller than in the image of Test 1. Nonetheless, the adversarial patch 100 still causes the machine learning model to misclassify the stop sign 104.

In Test 3 the enhanced adversarial patch 100 causes the machine learning model to misclassify the stop sign 104 as likely (88%) being a 100 KM speed sign. As illustrated, the enhanced adversarial patch 100 is at a same position relative to the stop sign 104 in Test 1, Test 2 and Test 3. In Test 3 however, the imaging device 112 has rotated relative to the stop sign 104 and the adversarial patch 100. Thus, in the image of Test 3, the stop sign 104 and the adversarial patch 100 appear rotated. Nonetheless, the adversarial patch 100 still causes the machine learning model to misclassify the stop sign 104.

In Test 4 the enhanced adversarial patch 100 causes the machine learning model to misclassify the stop sign 104 as likely (92%) being a 100 KM speed sign. As illustrated the enhanced adversarial patch 100 is moved and rotated relative to the stop sign 104 in Test 1, Test 2 and Test 3. Nonetheless, the adversarial patch 100 still causes the machine learning model to misclassify the stop sign 104.

Thus, regardless of the position and rotation of the adversarial patch 100 relative to the stop sign 104, and the rotation, position and zoom of the imaging device 112 relative to the stop sign 104 and/or the adversarial patch 100, the machine learning model still misclassifies the stop sign 104 as likely being a 100 KM sign. As such, the adversarial patch may be used to test robustness of machine learning models and/or train the machine learning models. In contrast, the conventional patch 102 may cause misclassification under some circumstances (e.g., Test 1), but not cause misclassification under other circumstances (Tests 2, 3 and 4). That is, the conventional patch 102 may not cause misclassification at certain distances, camera angles, camera rotations and/or environmental conditions.

The above enhanced adversarial patch 100 has adversarial patterns that are simple enough to be detected from different distances and will remain robust (detectable and cause misclassification) with respect to varying cameras distances and/or angles. In some embodiments, the adversarial patch 100 has large adversarial perturbations in the subparts of an image by choosing random subparts, scale and rotations.

Minute pixel level changes such as those of conventional patch 102 are not captured with enough detail to cause misclassification. As such, a method (discussed below) of forward-propagation to generate a patch from a block of pixels is introduced. The forward-propagation method forces a contiguous M×M block of pixels to have a same value (e.g., color and/or intensity), which decreases the visual complexity of the enhanced adversarial patch. The enhanced adversarial patch 100 may include simple enough patterns to be classified to a particular target class, even when the image is viewed at varying distances and angles. While other adversarial examples may not robustly transfer to the physical world, some embodiments of the present application generate adversarial patches that are simple enough to avoid physical world transformation effects on the enhanced adversarial patch 100.

Figure 1C:
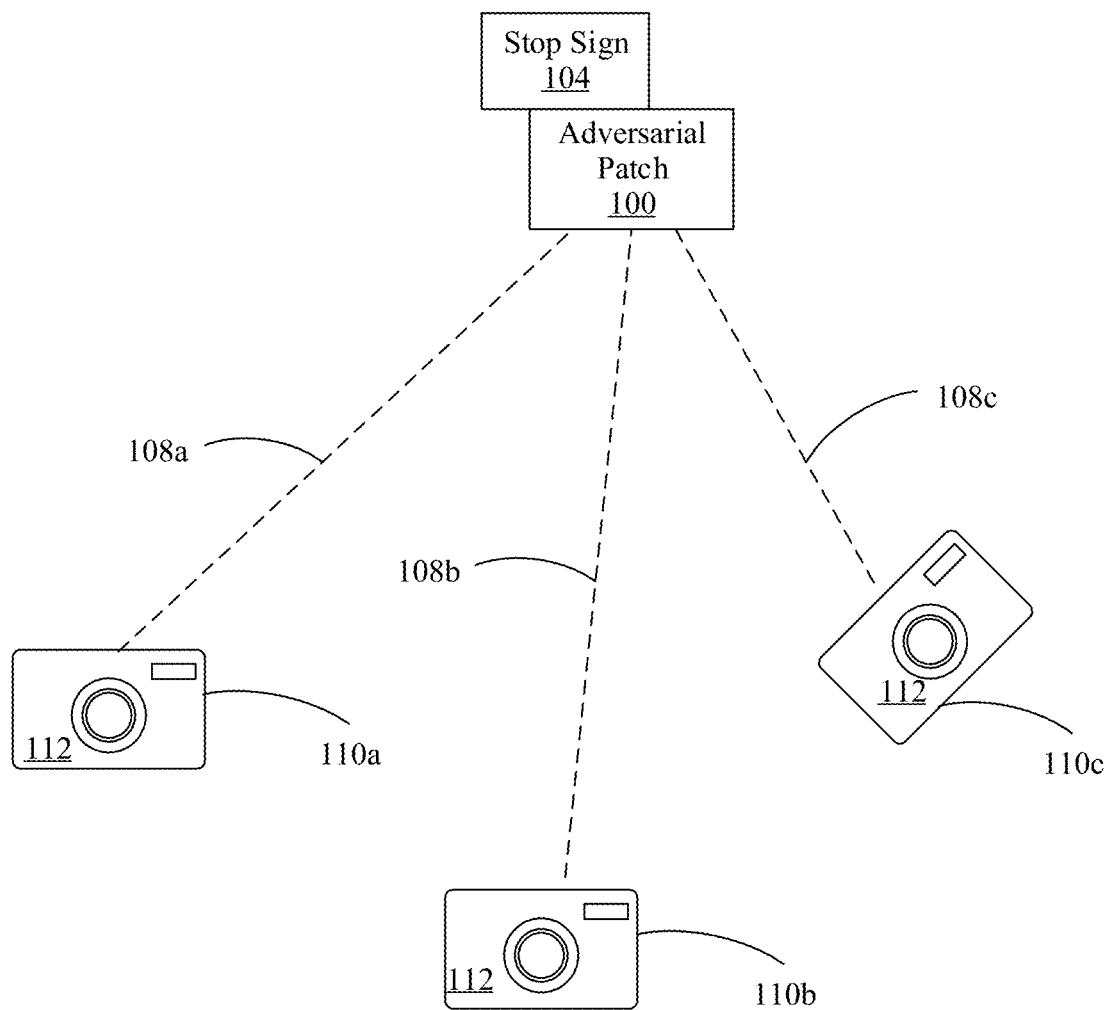
FIG. 1C shows different positions and/or rotations of an imaging device 112 relative to an adversarial patch according to some exemplary embodiments.

FIG. 1C illustrates different positions 110a, 110b, 110c and/or rotations of the imaging device 112 relative to the stop sign 104 and the adversarial patch 100. The lines of sight 108a, 108b, 108c between the imaging device 112 and the stop sign 104 and/or the adversarial patch 100 are illustrated. As described above, the machine learning model may misclassify the stop sign 104 in each position of the imaging device 112 due to the influence of the adversarial patch 100. The imaging device 112 may be any type of suitable imaging device (e.g., mobile camera, sensor array, night vision, etc.).

Each of the apparatus, methods and/or processes described herein may be implemented in hardware, in software, or in some combination thereof. For example, each of the method blocks described herein may be implemented in configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof Alternatively or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the modules may be written in any combination of one or more operating system applicable/appropriate programming languages, including an object oriented programming language such as JAVA, SMALLTALK, C++ or the like and conventional procedural programming languages, such as the "C" programming language or similar programming languages.

Figure 2:
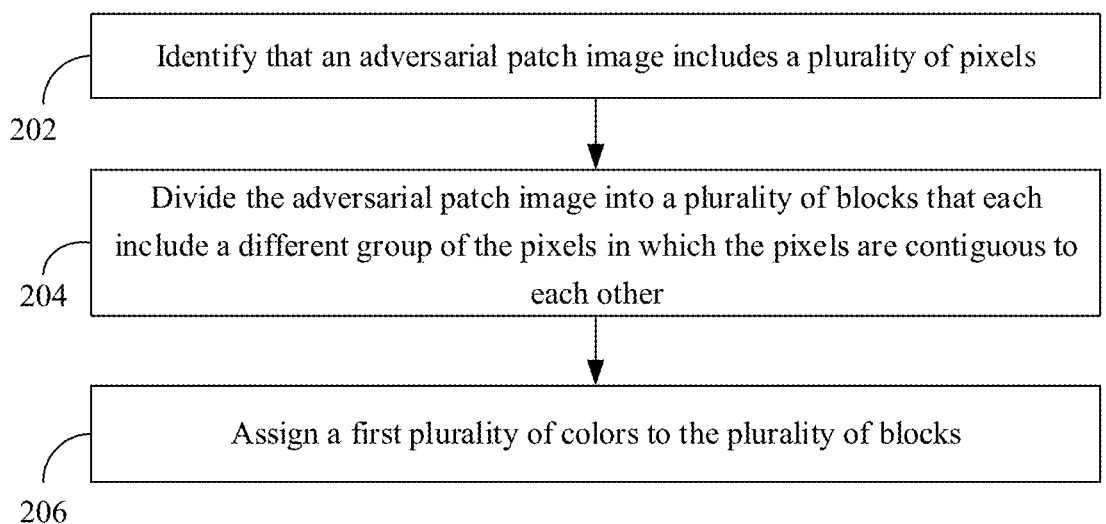
FIG. 2 illustrates a method of generating a color pattern for an adversarial patch according to some exemplary embodiments.

FIG. 2 illustrates a method 200 of generating a color pattern for an adversarial patch. Processing block 202 may identify that an adversarial patch image includes a plurality of pixels. Processing block 204 may divide the adversarial patch image into a plurality of blocks that each include a different group of the pixels in which the pixels are contiguous to each other. Processing block 206 may assign a first plurality of colors to the plurality of blocks to assign only one of the first plurality of colors to each pixel of one of the plurality of blocks. The colors may be different from each other. Processing block 206 may include assigning a first color of the first plurality of colors to a first block of the plurality of blocks, and modifying each pixel of the group of the pixels of the first block to be the first color. Processing block 206 may further include for each respective block of the plurality of blocks, modifying the group of the pixels of the respective block to be a same color of the first plurality of colors that is assigned to the respective block.

Figure 3:
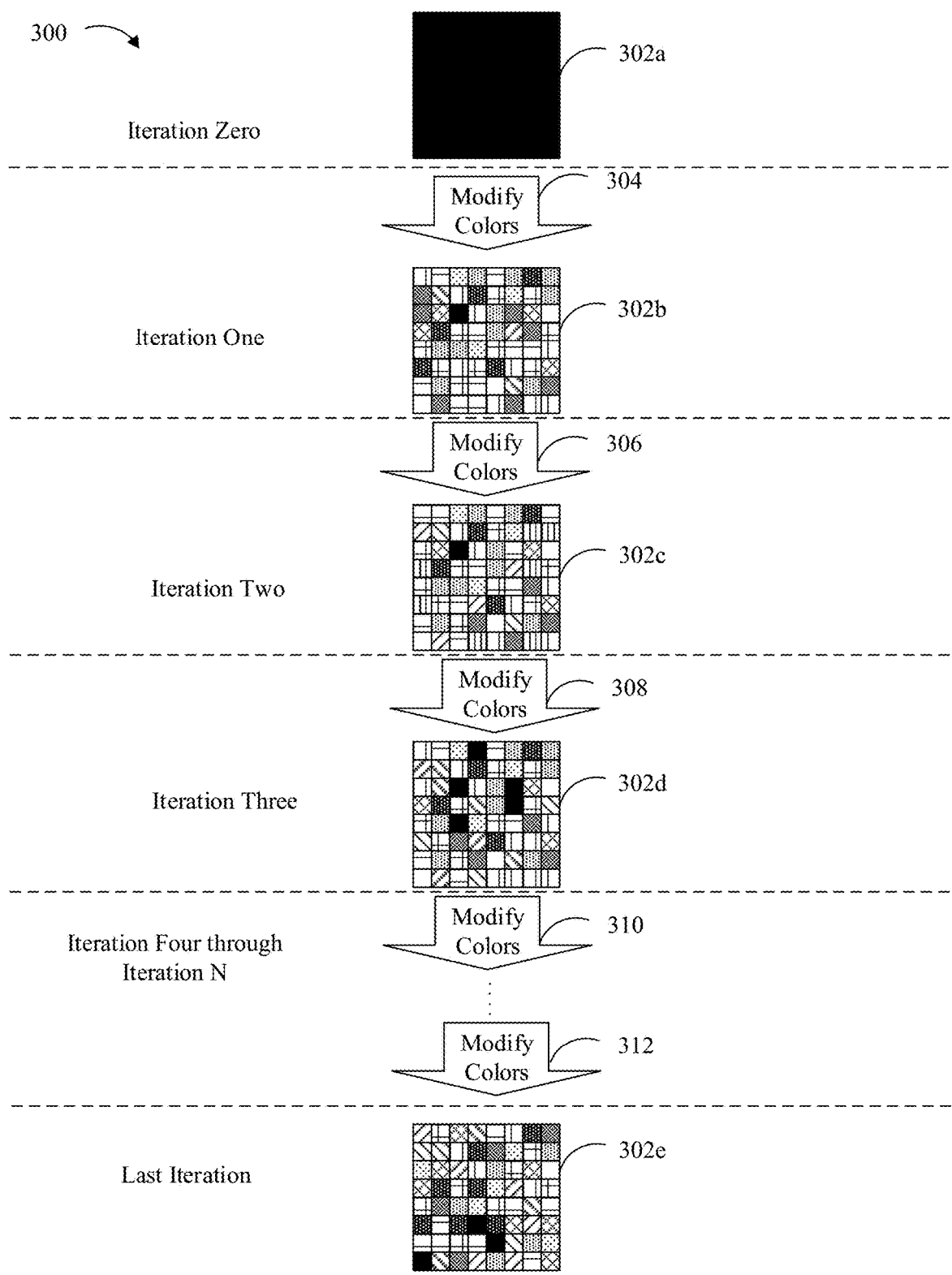
FIG. 3 illustrates an iterative process of generating final colors for an adversarial patch according to some exemplary embodiments.

FIG. 3 shows an iterative process 300 of generating final colors 302e for an adversarial patch. It will be understood that adversarial patch may include an adversarial patch image. In Iteration Zero, the adversarial patch is initialized to include all pixels at a same color 302a. Iteration Zero may further include dividing the adversarial patch into a plurality of blocks that each include a group of contiguous pixels (e.g., each block may be M×M pixels). The boundaries of the blocks may remain the same throughout the process 300.

As illustrated, the blocks of the adversarial patch in Iteration Zero are a same color 302a, but in some embodiments the blocks of the adversarial patch may be initialized to different, random colors. For example, the patch may be initialized randomly. In some embodiments, the adversarial patch may be randomly initialized so that each block may have a different color.

The process 300 may then modify the colors 304 in Iteration One. In detail, the process 300 may modify the color 302a to generate first colors 302b for the adversarial patch. For example, the colors 302a are modified to various different first colors 302b. As described above, the different patterns represent different colors and/or characteristics of the pixels of the blocks, such as intensity. Thus, different first colors 302b may be written into the different blocks of the adversarial patch. For example, one block may be blue, a second red, a third yellow, etc.

To enhance the reliability and accuracy of misclassification, the process 300 may test to make sure that misclassification is increasing. For example, the process 300 may superimpose the adversarial patch having the color 302a over a target image through software and/or hardware processes. A machine learning model may then classify the target image with the superimposed initial adversarial patch having the color 302a. The process 300 may record the classification. As an example, suppose that the target image is an image of a stop sign. The process 300 would superimpose the adversarial patch having the color 302a over the stop sign to generate a first classification image and the machine learning model would classify the first classification image. For example, the machine learning model may classify the first classification image, for example as being 95% a stop sign. In contrast, if the adversarial patch having the color 302a was not superimposed over the stop sign, the machine learning model may classify the stop sign as being 99% a stop sign.

The process 300 may identify whether misclassification (loss) increases. For example, an increase in misclassification may occur when the machine learning model reduces a probability that the target image belongs to a correct category, increases a probability that the target image belongs to an incorrect category and/or identifies the target image as being in an incorrect category. For example, in the above example, a probability of misclassification increases with the superimposition of the adversarial patch having the color 302a over the stop sign because the probability of a correct classification decreases from 99% to 95%.

Process 300 may then modify the colors 304 in Iteration One to increase the misclassification. For example, the modification of the colors 304 may include a determination of whether the first colors 302b increase misclassification as described above. For example, the machine learning model may classify an image that includes the adversarial patch having the first colors 302b superimposed on the target image. Continuing with the above example, suppose that the machine learning model classifies an image that includes the stop sign and the adversarial patch, that has the first colors 302b, as being 100 KM sign. In the present example, the misclassification increases, and therefore the first colors 302b are stored as the new colors.

The process 300 may continue to modify colors 306, 308, 310, 312 to generate colors 302c, 302d, 302e until the last iteration to increase misclassification. In some embodiments, the number of iterations is predetermined. At the last iteration, the process 300 may identify that there are no further modifications that may increase misclassification, and adversarial patch is to include the last colors 302e. In some embodiments, the process 300 may conclude that the misclassification has reached a threshold of misclassification (e.g., the target image is 95% classified into an incorrect category) to determine that no more iterations are necessary and the last colors 302e are to form the final adversarial patch. For example, if the machine learning model misclassifies an image that includes the target image and the adversarial patch with the first colors 302b at a probability that meets a threshold, the process 300 may determine that no further iterations are needed.

As a more detailed example, the threshold may be set to 95% misclassification. If the target image is a stop sign and the adversarial patch with the last colors 302e causes the machine learning model to classify the stop sign as a 100 KM sign with 95% confidence, the threshold has been met. If however the machine learning model classified the stop sign as a 100 KM sign with 94% confidence, the threshold may not have been met. In some embodiments, if the process 300 determines that the threshold is unable to be met, the last colors 302e may still be output as assigned to the adversarial patch along with a notification that the adversarial patch does not meet the threshold.

In some embodiments, the adversarial patch having the last colors 302e may be used to train a machine learning model through computer implemented modifications of existing images to superimpose the adversarial patch of the images. In some embodiments, the adversarial patch having the last colors 302e may be physically printed to train a machine learning model.

Figure 4:
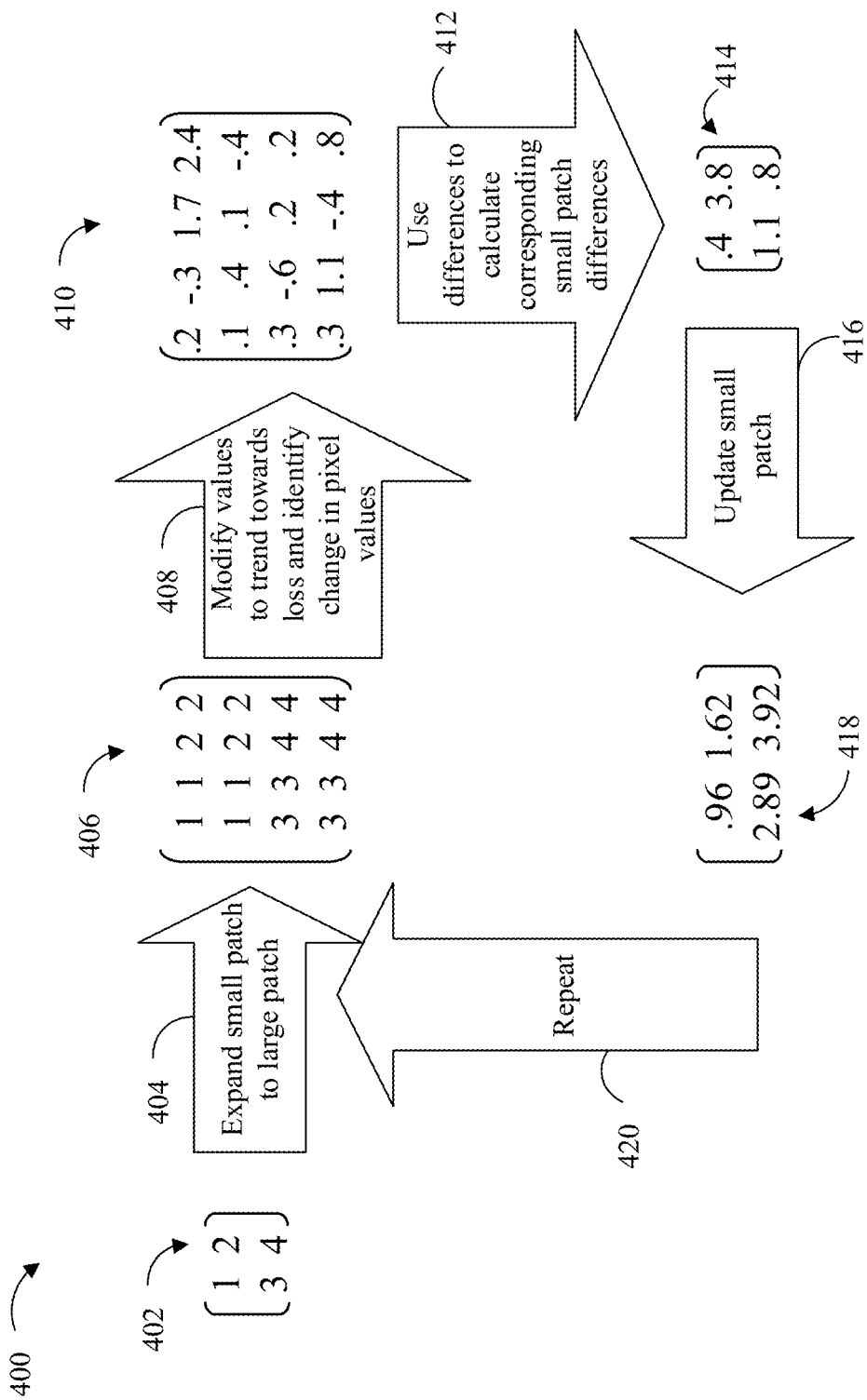
FIG. 4 illustrates a process to generate pixel values for an adversarial patch according to some exemplary embodiments.

FIG. 4 illustrates a process 400 to generate pixel values for an adversarial patch. FIG. 4 may be utilized for example in the process 300 of FIG. 3, or any of the methods or apparatuses described herein. For simplicity, process 400 uses grayscale with each the values of the various matrices indicative of intensity. It will be understood however that process 400 is applicable to different representations of color (e.g., R, G, B values). In such different representations, the process 400 may include various matrices that each correspond to a different component (e.g., one matrix for red, one for blue, one for green, etc.) of the representation. The matrices of process 400 may correspond to pixels. In cases where different matrices are used to represent the different representations of color (e.g., R, G, B values), then the process 400 is repeated each time for each matrix.

The process 400 may force contiguous m×m pixels to have the same characteristics to generate patches that are less complex and simple enough to be captured well by low quality cameras (e.g., camera phones). As will be discussed in further detail below, process 400 may modify colors through a smaller patch $p_s$ 402. The smaller patch $p_s$ may have dimensions H/m×W/m if the adversarial patch is intended to be of dimensions H×W. From small patch $p_s$ 402 the process 400 may expand the small patch to a large patch 404 to obtain a large (e.g., blown up) patch $p_l$ 406 of dimensions H×W by copying each pixel of smaller version $p_s$ 402 m×m times to create blocks of colors in the adversarial patch. In some embodiments, process 400 may use forward-propagation to convert the smaller patch $p_s$ into the larger patch $p_l$.

Thus, in some examples the small patch $p_s$ 402 is a subset of the large patch $p_l$ 406. The large patch $p_l$ 406 may include similar values in a plurality of quadrants to correspond to colors in various blocks of contiguous pixels. The large patch $p_l$ 406 may correspond to pixels of the adversarial patch. That is, each value in the matrix of the large patch $p_l$ 406 may correspond to a pixel of the adversarial patch. For example, the matrix may approximate x-y coordinates of pixels so that a position of an element corresponds to an x-y coordinate of a pixel and represents an intensity at that x-y coordinate. Pixels which are contiguous may be represented by adjacent values in the matrix.

Process 400 may then modify the values in the large patch $p_l$ 406 to trend towards increased loss through gradient descent, and identify changes in pixel values 408. The loss may be a measure of incorrectness of classification of a target image that includes an adversarial patch by a machine learning model. Thus, as the misclassification increases, the loss increases to decrease the probability of a correct classification and/or increase the probability of an incorrect classification. A difference or an approximate difference between the modified values and the original values in the large patch $p_l$ 406 is calculated and stored in a difference patch $p_d$ 410. That is, an amount each element from the large patch $p_l$ 406 is modified to generate the modified values is stored in the difference patch $p_d$ 410.

To identify loss, the process 400 may randomly cover a part of a target image with an adversarial patch that includes the modified values at a random location, scale and rotations. For example, process 400 may modify the target image (e.g., a software and/or hardware implemented modification) to include the adversarial patch. The process 400 may thus update the large patch $p_l$ so as to minimize cost with respect to a target class using gradient descent to generate the modified values.

For example, suppose T is a transformation function that takes the large patch version $p_l$, image x, location loc, scaling s and rotation r and gives a transformed image $\hat{x}=T(p_l, x, loc, s, r)$, such that $\hat{x}$ is obtained after applying the patch $p_l$ scaled by s and rotated by r at location loc of the image x. Some embodiments may obtain a patch $\hat{p}$, that maximizes the probability of target class $\hat{y}_t$ over the data sampled using the above transformation function T Some embodiments therefore optimize the following equation 1, where X is training data, R is the set of rotations in range [−20 degree, 20 degree], S is the set of scales i.e. the fraction of image covered by patch, and L is the set of locations possible in the image x $$\hat{p} = \arg\max_p \mathbb{E}_{x \in X, r \in R, s \in S, loc \in L}[\log Pr(\hat{y}_t | T(p_l, x, loc, r, s))]$$ EQUATION 1

The process 400 may continue to use the differences from the difference patch $p_d$ 410 to calculate corresponding small patch differences 412 and store the differences in a small difference patch 414. For example, values associated with one block may be added together and stored in the small difference patch 414 at corresponding locations. That is, the four values (0.2, 0.1, 0.4, −0.3) from the upper left quadrant may correspond to a first block, are added together to determine a first value (0.4) and the first value is stored in the upper left position of the small difference patch 414. The four values (1.7, 2.4, 0.1, −0.4) from the upper right quadrant may correspond to a second block, are added together to determine a second value (3.8) and the second value is stored in the upper right position of the small difference patch 414. The four values (0.3, −0.6, 0.3, 1.1) from the lower left quadrant may correspond to a third block, are added together to determine a third value (1.1) and the third value is stored in the lower left position of the small difference patch 414. The four values (0.2, 0.2, −0.4, 0.8) from the lower right quadrant may correspond to a fourth block, are added together to determine a fourth value (0.8) and the fourth value is stored in the lower right position of the small difference patch 414. The first-fourth blocks are different blocks of pixels of the adversarial patch.

In some embodiments, a small change in settings of large patch generation may change the way that the small patch differences are calculated. Thus, some embodiments may automatically utilize the chain rule of derivatives to convert from large patch differences to small patch differences.

Process 400 may then update the small patch 416 to generate an updated small patch 418. For example, the process 400 may update the small patch $p_s$ 402 patch based on the first-fourth values in the small difference patch 414. In the present example, the first-fourth values may be multiplied by a constant (e.g., 0.1) and subtracted from corresponding values in the small patch $p_s$ 402 patch that are in the same position and/or correspond to the same block as the first-fourth values. The process 418 may repeat 420 using the values in the updated small patch 418.

Figure 5:
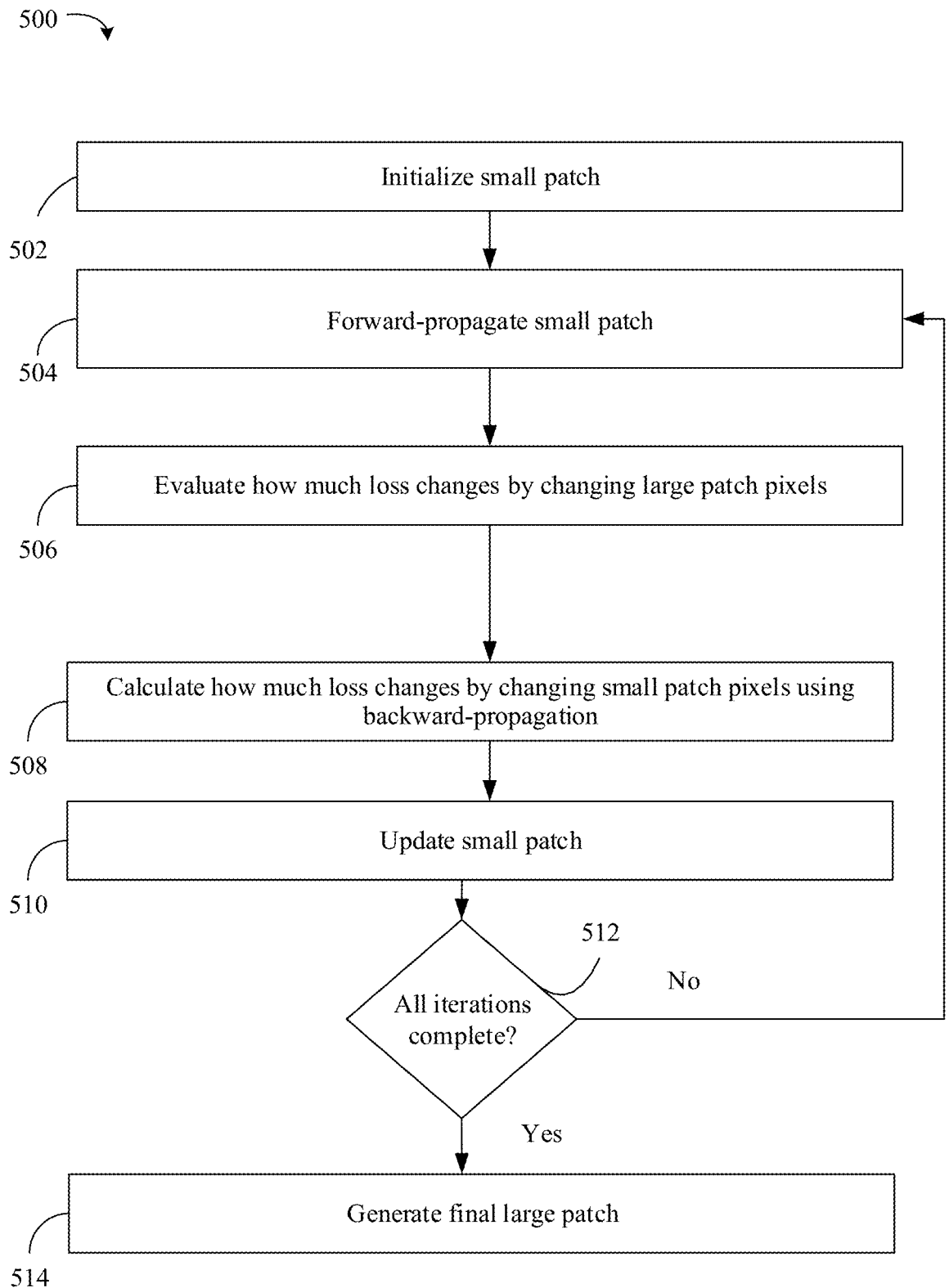
FIG. 5 illustrates a method to generate an adversarial patch according to some exemplary embodiments.

FIG. 5 illustrates a method 500 of a flow of generating an adversarial patch. Illustrated processing block 502 initializes a small patch $p_s$. The patch initialization may be determined according to the following algorithm 1:

---
Algorithm 1
---

Image Dimensions = H X H
Patch Block = m, for m X m blocks
Patch Len = int(H/Patch Block)
Patch Shape = (Patch Len,Patch Len,3)
    Algorithm 1: generate-patch generates small patch ps
    Data: X : Training data
    for number of iterations do
        for each batch $X_B \in X$ do
            $p_l$ = forward-prop($p_s$)
            $X^*_B$ = T($p_l$, $X_B$; loc, r, s)
            L = loss( M(X*B), t)
            use gradient descent to calculate $\nabla_{pl} L$ ---
Algorithm 1
---

$\nabla_{ps} L$ = back-prop($\nabla_{pl} L$)
            update $p_s$ as $p_s = p_s - \varepsilon \nabla_{ps} L$, $\varepsilon > 0$; is step size
        end
    end

---

Illustrated processing block 504 forward-propagates the small patch to generate a larger patch. For example, processing block 504 may generate an enlarged patch using the below forward-prop algorithm 2, and then generates the patched training data $X_B^*$ using the transformation function T.

In some embodiments, processing block 504 follows algorithm 2 to execute the forward-propagate process:

---
Algorithm 2
---

Forward-prop: Generate $H \times H$ patch from $\frac{H}{m} \times \frac{W}{m}$

Data: x: the $\frac{H}{m} \times \frac{W}{m}$ patch

Result: Get the larger $H \times H$ patch from smaller $\frac{H}{m} \times \frac{W}{m}$ patch result = Empty_Array(shape=(0, H, 3))
for i in range (Patch_Len) do
    populate row = Empty_Array(shape = (Patch_Block, 0, 3))
    for j in range (Patch_Len) do
        populate_box = Array(x[i] [j])
        populate_box = Tile(populate_box, shape=(Patch Block_Patch Block,1))
        populate row = Concatenate((populate row,populate box),axis=1)
    end
    result = Concatenate((result,populate row),axis=0)
end
return result

---

Illustrated processing block 506 evaluates how much a loss changes by changing the large patch pixels and identifies a difference between original pixel values and modified pixel values to increase the loss. For example, processing block 506 may then compute a derivative of Loss L with respect to (w.r.t.) the enlarged patch, where L =loss(M($X_B^*$), t). The loss may be a cross-entropy loss between the prediction M($X_B^*$) with respect to a target label t. M(x) is the softmax-prediction of Model M for input x.

Illustrated processing block 508 calculates how much the loss changes by changing small patch pixels using backward-propagation. For example, processing block 508 may compute a derivative of loss with respect to small patch $p_s$ using an algorithm 3 (back-prop) and update the small patch $p_s$ in the direction of negative gradient thus obtained. In some embodiments, processing block 508 follows algorithm 3 below to execute the backward-propagation operation:

Algorithm 3

Algorithm 3: back-prop: Generate $\frac{H}{m} \times \frac{W}{m}$ gradient from $H \times H$ gradients Data: grad: grad w.r.t H × H patch
Result: gradient w.r.t $\frac{H}{m} \times \frac{W}{m}$ patch
result = Tensor_Zeros (shape = (0, Patch Len, 3))
for i in range (Patch_Len) do
   populate_row = Tensor_Zeros(shape = (1, 0, 3))
   for j in range (Patch_Len) do
     sum = 0
     for i1 in range(Patch_Block*i, Patch Block*i+Patch Block) do
       for i2 in
       range(Patch_Block*j,Patch_Block*j+Patch_Block) do
         sum += grad[i1] [i2]
       end
     end
     sum = Tensor.Reshape(sum,[1,1,3])
     populate row = Tensor.Concatenate([populate row, sum], axis=1)
   end
   result = Tensor.Concatenate([result,populate row],axis=0)
end
return result Processing block 510 updates the small patch based on the change in loss calculated by block 508. Processing block 512 may determine whether any further iterations are needed (e.g., whether loss should be increased). If not, processing block 514 generates a final large patch from the updated small patch. If further iterations are needed, processing block 504 may execute again.

Figure 6:
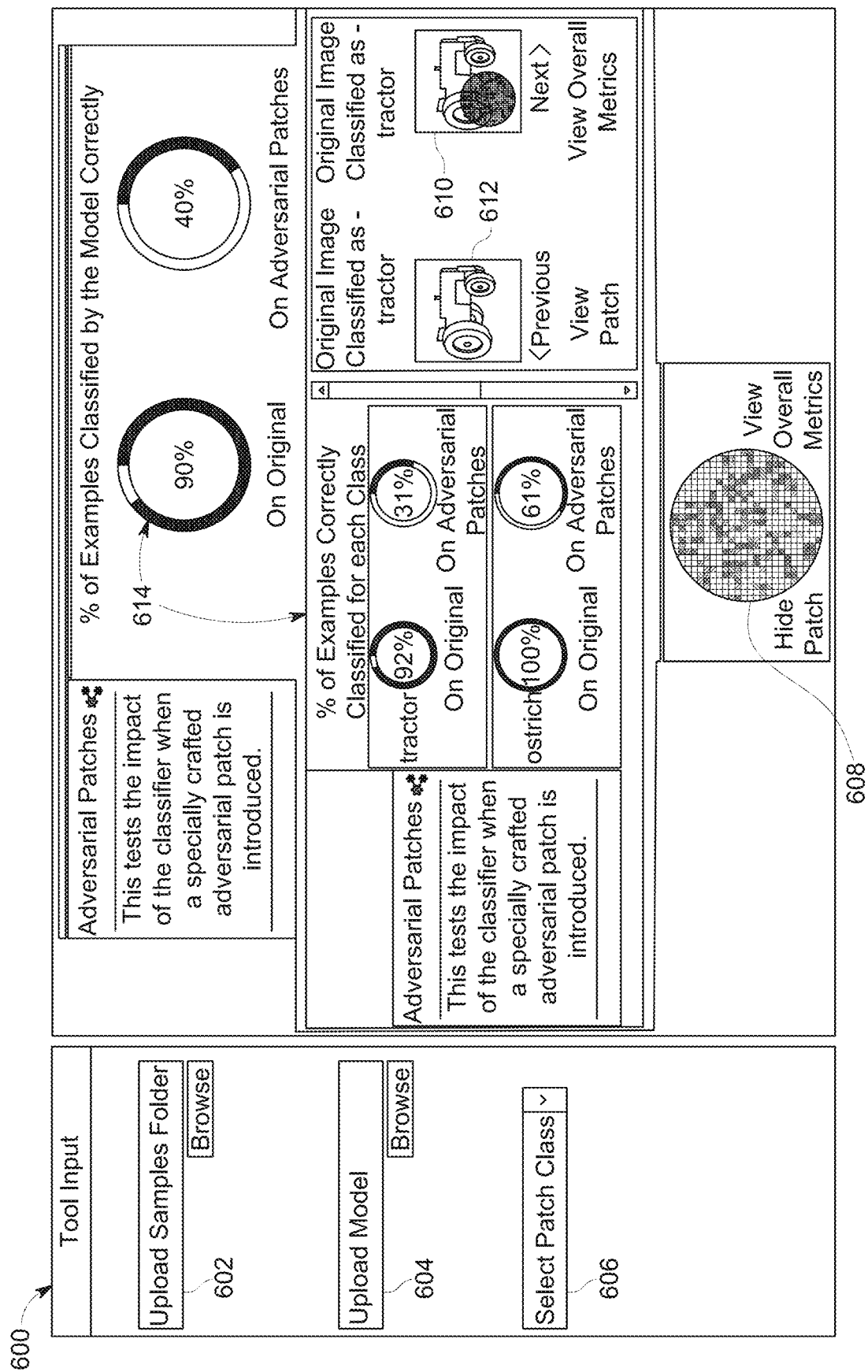
FIG. 6 illustrates a computer-implementable graphical user interface according to some exemplary embodiments.

FIG. 6 illustrates a computer-implementable graphical user interface 600 according to some embodiments. Input 602 may allow a user to upload a sample folder of target images (e.g., stop signs, ostrich images, 100 KM signs) that are to be misclassified by a machine learning model (e.g., neural network). Input 604 allows the user to upload a machine learning model that is to be caused to misclassify the target images. Input 606 may allow the user to select a particular misclassification. So for example, if the target images are 100 KM signs, the user may select that the patch class to be stop signs. In other words, the user may select that the machine learning model is to be caused to misclassify the 100 KM signs as stop signs. Thus, inputs 602, 604, 606 are user modifiable inputs.

Based on the inputs 604, 606, 602, a patch may be generated to achieve the user's objectives. In the present example, area 612 illustrates the original image which are tractors. Area 610 illustrates the patch overlaid on the images. As is apparent from area 610, the tractor was unable to be misclassified and so area 610 provides a warning along with a patch that includes colors most likely to drop probability of correct classification. The patch is shown in detail at area 608. Area 614 illustrates the effectiveness of adversarial patches based on a comparison of the machine learning network classifying the images without the adversarial patch and with the adversarial patches.

Figure 7:
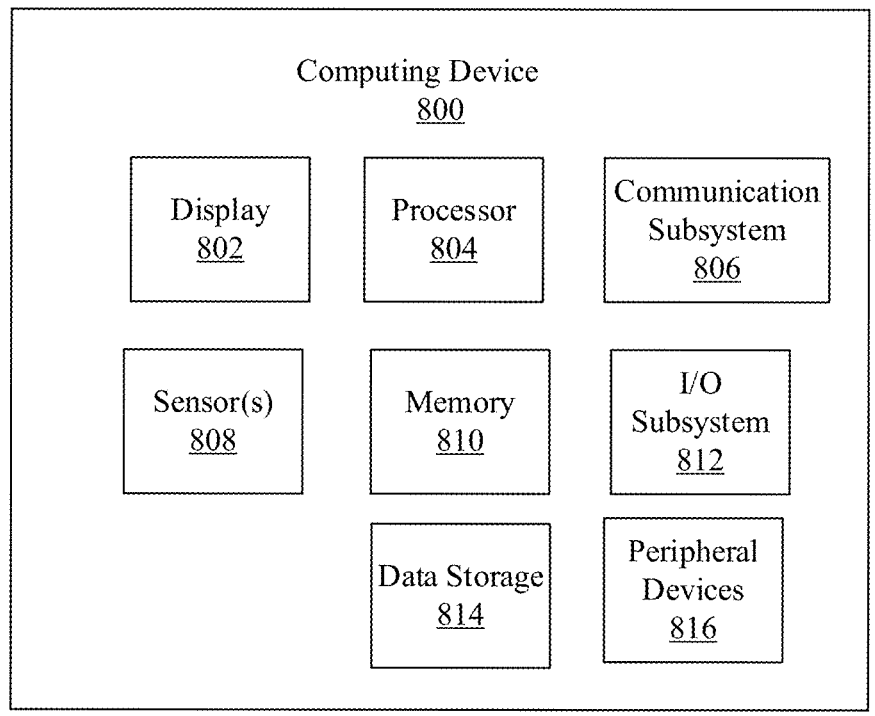
FIG. 7 illustrates a computing device for generating an adversarial patch and machine learning model according to some exemplary embodiments.

Referring now to FIG. 7, an exemplary computing device 800 (e.g., an intermediate level server 122) for generating the adversarial patch 100 and performing the process 106 of FIGS. 1A, 1B and 1C, method 200 of FIG. 2, process 300 of FIG. 3, process 400 of FIG. 4, method 500 of FIG. 5, and the graphical user interface 600 of FIG. 6. The computing device 800 may include a processor 804, a memory 810, a data storage 814, a communication subsystem 806 (e.g., transmitter, receiver, transceiver, etc.), and an I/O subsystem 812. Additionally, in some embodiments, one or more of the illustrative components may be incorporated in, or otherwise form a portion of, another component. For example, the memory 810, or portions thereof, may be incorporated in the processor 804 in some embodiments. The computing device 800 may be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device.

The processor 804 may be embodied as any type of processor capable of performing the functions described herein. For example, the processor 804 may be embodied as a single or multi-core processor(s), digital signal processor, microcontroller, or other processor or processing/controlling circuit.

The memory 810 may be embodied as any type of volatile or non-volatile memory or data storage capable of performing the functions described herein. In operation, the memory 810 may store various data and software used during operation of the computing device 800 such as operating systems, applications, programs, libraries, and drivers. The memory 810 is communicatively coupled to the processor 804 via the I/O subsystem 812, which may be embodied as circuitry and/or components to facilitate input/output operations with the processor 804 the memory 810, and other components of the computing device 800.

The data storage device 814 may be embodied as any type of device or devices configured for short-term or long-term storage of data such as, for example, memory devices and circuits, memory cards, hard disk drives, solid-state drives, non-volatile flash memory, or other data storage devices. With respect to generation of adverbial patches and machine learning models, the data storage device 814 may store data (e.g., computer code) to execute the processes and methods described herein. Alternatively, such data may be stored remotely. In some embodiments, the processor 804 or other hardware components may be configured to execute the processes and methods. Regardless, the computing device 800 may identify that an adversarial patch image includes a plurality of pixels, divide the adversarial patch image into a plurality of blocks that each include a different group of the pixels in which the pixels are contiguous to each other, and assign a first plurality of colors to the plurality of blocks.

The computing device 800 may also include a communications subsystem 806, which may be embodied as any communication circuit, device, or collection thereof, capable of enabling communications between the computing device 800 and other remote devices over a computer network (not shown). The communications subsystem 806 may be configured to use any one or more communication technology (e.g., wired or wireless communications) and associated protocols (e.g., Ethernet, Bluetooth®, WiMAX, LTE, etc.) to affect such communication.

As shown, the computing device 800 may further include one or more peripheral devices 816. The peripheral devices 816 may include any number of additional input/output devices, interface devices, and/or other peripheral devices. For example, in some embodiments, the peripheral devices 816 may include a display, touch screen, graphics circuitry, keyboard, mouse, speaker system, microphone, network interface, and/or other input/output devices, interface devices, and/or peripheral devices. The computing device 800 may also perform one or more of the functions described in detail above and/or may store any of the databases referred to below.

It will be understood that the foregoing description is applicable to any size image or adversarial patches. For example, the adversarial patches may include any number of blocks and any number of pixels.

The flowchart and block diagrams in the Figures illustrate the architecture, functionality, and operation of possible implementations of systems, methods and computer program products according to various exemplary embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The methods shown herein may generally be implemented in a computing device or system. The computing device or system may be a user level device or system or a server-level device or system. More particularly, the methods may be implemented in one or more modules as a set of logic instructions stored in a machine or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the methods and processes of any of the figures herein may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, and/or other structural components that are native to hardware (e.g., host processor, central processing unit/CPU, microcontroller, etc.).

Example sizes/models/values/ranges may have been given, although embodiments are not limited to the same. Where specific details are set forth in order to describe example embodiments, it should be apparent to one skilled in the art that embodiments can be practiced without, or with variation of, these specific details. The description is thus to be regarded as illustrative instead of limiting.

Those skilled in the art will appreciate from the foregoing description that the broad techniques of the one or more embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An adversarial patch generation system, comprising:
 a memory; and
 a processor coupled to the memory, wherein the processor is configured to:
  identify that an adversarial patch image includes a plurality of pixels;
  divide the adversarial patch image into a plurality of blocks that each include a different group of the pixels in which the pixels are contiguous to each other; and
  assign a first plurality of colors to the plurality of blocks to assign only one of the first plurality of colors to each pixel of one of the plurality of blocks.

2. The system of claim 1, wherein the processor is to:
 assign a first color of the first plurality of colors to a first block of the plurality of blocks; and
 modify each pixel of the group of the pixels of the first block to be the first color.

3. The system of claim 2, wherein the processor is to execute an iterative process to:
 during a first iteration, assign a second color to the first block;
 during a second iteration, change the second color to a third color and assign the third color to the first block; and
 during a final iteration, change the third color to the first color to assign the first color to the first block.

4. The system of claim 1, wherein the processor is to:
 for each respective block of the plurality of blocks, modify the group of the pixels of the respective block to be a same color of the first plurality of colors that is assigned to the respective block.

5. The system of claim 1, wherein the processor is to:
 execute an iterative process to generate first pixel values for the plurality of pixels during a final iteration, wherein the first pixel values are to be associated with the first plurality of colors.

6. The system of claim 5, wherein the processor is to execute the iterative process to:

generate during a previous iteration before the final iteration, second pixel values for the plurality of pixels, wherein the second pixel values correspond to a second plurality of colors; and generate the first pixel values based on the second pixel values.

7. The system of claim 6, wherein the processor is to:

identify, during the final iteration, a first loss that is a measure that the adversarial patch image having the first pixel values causes a machine learning system to misclassify an object;

identify, during the previous iteration, a second loss that is a measure that the adversarial patch image having the second pixel values causes a machine learning system to misclassify the object; and determine that the adversarial patch image is to have the first pixel values and not the second pixel values based on an identification that the first loss meets a threshold and the second loss does not meet the threshold.

8. A method comprising:

identifying that an adversarial patch image includes a plurality of pixels;

dividing the adversarial patch image into a plurality of blocks that each include a different group of the pixels in which the pixels are contiguous to each other; and assigning a first plurality of colors to the plurality of blocks to assign only one of the first plurality of colors to each pixel of one of the plurality of blocks.

9. The method of claim 8, further comprising:

assigning a first color of the first plurality of colors to a first block of the plurality of blocks; and modifying each pixel of the group of the pixels of the first block to be the first color.

10. The method of claim 9, further comprising executing an iterative process that includes:

during a first iteration, assigning a second color to the first block;

during a second iteration, changing the second color to a third color and assigning the third color to the first block; and during a final iteration, changing the third color to the first color to assign the first color to the first block.

11. The method of claim 8, further comprising:

for each respective block of the plurality of blocks, modifying the group of the pixels of the respective block to be a same color of the first plurality of colors that is assigned to the respective block.

12. The method of claim 8, further comprising:

executing an iterative process to generate first pixel values for the plurality of pixels during a final iteration, wherein the first pixel values are to be associated with the first plurality of colors.

13. The method of claim 12, wherein the executing the iterative process includes:

generating during a previous iteration before the final iteration, second pixel values for the plurality of pixels, wherein the second pixel values correspond to a second plurality of colors; and generating the first pixel values based on the second pixel values.

14. A non-transitory computer readable medium comprising a set of instructions, which when executed by one or more processors of a device, cause the one or more processors to:

identify that an adversarial patch image includes a plurality of pixels;

divide the adversarial patch image into a plurality of blocks that each include a different group of the pixels in which the pixels are contiguous to each other; and assign a first plurality of colors to the plurality of blocks to assign only one of the first plurality of colors to each pixel of one of the plurality of blocks.

15. The non-transitory computer readable medium of claim 14, wherein the set of instructions, which when executed by the one or more processors, cause the one or more processors to:

assign a first color of the first plurality of colors to a first block of the plurality of blocks; and modify each pixel of the group of the pixels of the first block to be the first color.

16. The non-transitory computer readable medium of claim 15, wherein the set of instructions, which when executed by the one or more processors, cause the one or more processors to execute an iterative process to:

during a first iteration, assign a second color to the first block;

during a second iteration, change the second color to a third color and assign the third color to the first block; and during a final iteration, change the third color to the first color to assign the first color to the first block.

17. The non-transitory computer readable medium of claim 14, wherein the set of instructions, which when executed by the one or more processors, cause the one or more processors to:

for each respective block of the plurality of blocks, modify the group of the pixels of the respective block to be a same color of the first plurality of colors that is assigned to the respective block.

18. The non-transitory computer readable medium of claim 14, wherein the set of instructions, which when executed by the one or more processors, cause the one or more processors to:

execute an iterative process to generate first pixel values for the plurality of pixels during a final iteration, wherein the first pixel values are to be associated with the first plurality of colors.

19. The non-transitory computer readable medium of claim 18, wherein the set of instructions, which when executed by the one or more processors, cause the one or more processors to execute the iterative process to:

generate during a previous iteration before the final iteration, second pixel values for the plurality of pixels, wherein the second pixel values correspond to a second plurality of colors; and generate the first pixel values based on the second pixel values.

20. The non-transitory computer readable medium of claim 19, wherein the set of instructions, which when executed by the one or more processors, cause the one or more processors to:

identify, during the final iteration, a first loss that is a measure that the adversarial patch image having the first pixel values causes a machine learning system to misclassify an object;

identify, during the previous iteration, a second loss that is a measure that the adversarial patch image having the second pixel values causes a machine learning system to misclassify the object; and determine that the adversarial patch image is to have the first pixel values and not the second pixel values based on an identification that the first loss meets a threshold and the second loss does not meet the threshold.

\* \* \* \* \*

UNITED STATES PATENT AND TRADEMARK OFFICE
CERTIFICATE OF CORRECTION

PATENT NO. : 10,997,470 B2
APPLICATION NO. : 16/557385
DATED : May 4, 2021
INVENTOR(S) : Manish Ahuja et al.

Page 1 of 1

It is certified that error appears in the above-identified patent and that said Letters Patent is hereby corrected as shown below:

In the Specification

At Column 7, Description of the Embodiments, Line 60, after "thereof", insert --.-- therefor.

At Column 10, Description of the Embodiments, Line 21, delete "$p_1$" and insert --$p_l$-- therefor.

At Column 11, Description of the Embodiments, Line 2, after "T", insert --.-- therefor.

At Column 15, Description of the Embodiments, Line 11, before "WiMAX,", insert --Wi-Fi®,-- therefor.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*